Figure 4:
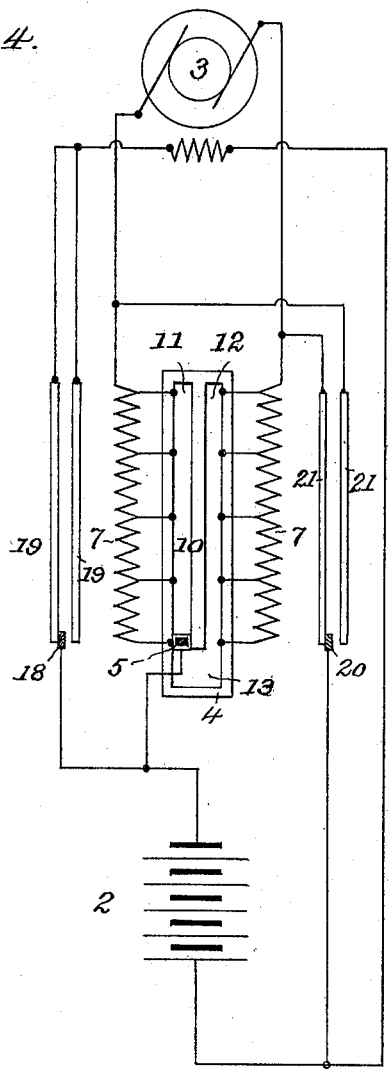

No. 653,168. Patented July 3, 1900.
C. J. COLEMAN.
MOTOR VEHICLE.
(Application filed Aug. 11, 1899.)
(No Model.) 2 Sheets—Sheet 1.
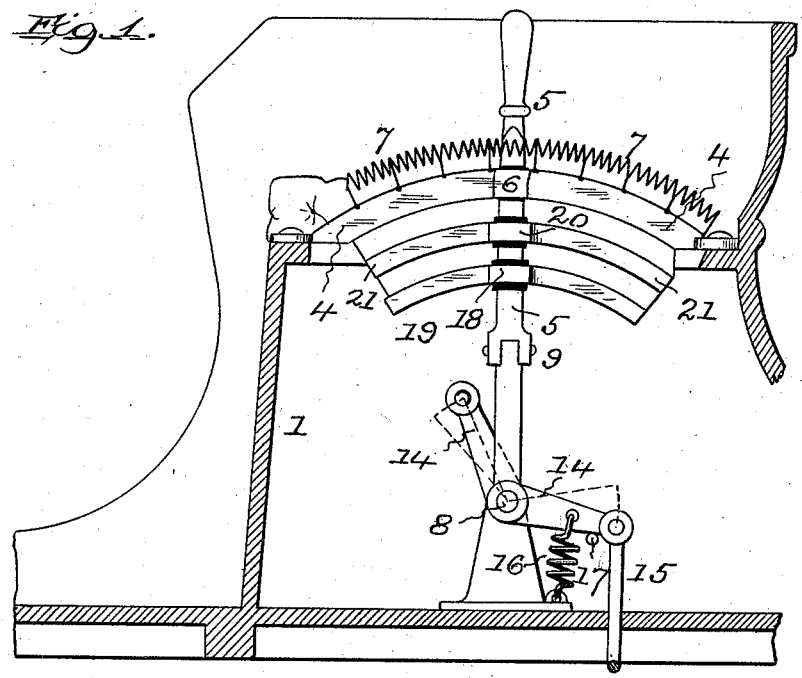
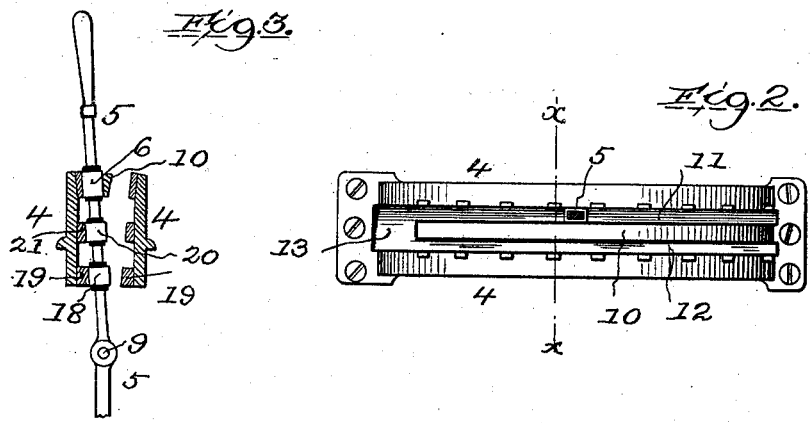
Attest:
Inventor:
Clyde J. Coleman,
By Robert Burns Attorney.

No. 653,168. Patented July 3, 1900.
C. J. COLEMAN.
MOTOR VEHICLE.
(Application filed Aug. 11, 1899.)

(No Model.) 2 Sheets—Sheet 2.

Attest:
James Lavallen
M. H. Holmes.

Inventor:
Clyde J. Coleman,
by Robert Burns Att'y.

UNITED STATES PATENT OFFICE.

CLYDE J. COLEMAN, OF CHICAGO, ILLINOIS, ASSIGNOR TO THOMAS J. RYAN, OF NEW YORK, N. Y.

MOTOR-VEHICLE.

SPECIFICATION forming part of Letters Patent No. 653,168, dated July 3, 1900.

Application filed August 11, 1899. Serial No. 726,931. (No model.)

*To all whom it may concern:*

Be it known that I, CLYDE J. COLEMAN, a citizen of the United States, residing at Chicago, in the county of Cook and State of Illinois, have invented certain new and useful Improvements in Motor-Vehicles; and I do hereby declare the following to be a full, clear, and exact description of the same, reference being had to the accompanying drawings, forming a part of this specification.

The present improvements relate to the controlling means for electrically-propelled vehicles.

The object of the present improvements is in the main to provide a simple, convenient, and effective combination of the current-controller and the brake-actuating means in which the manually-actuated movable member of the current-controller is adapted to operate the brake mechanism of the vehicle by a further or continued movement of such movable member past the point at which it breaks the current to the electric motor of the vehicle.

A further object of the present invention is to provide a simple and effective construction and arrangement of parts of the current-controller by means of which the same is also adapted to act as a current-reversing switch, all as will hereinafter more fully appear and be more particularly pointed out in the claims.

In the accompanying drawings, illustrative of the present invention, Figure 1 is a fragmentary longitudinal section of the seat portion of a vehicle, illustrating the general arrangement of the current controlling and reversing mechanism of the present invention; Fig. 2, a plan view of such mechanism; Fig. 3, a transverse section of the same; Fig. 4, a diagram view illustrating the connections of the present circuit controlling and reversing mechanism with the battery and motor.

Similar numerals of reference indicate like parts in the several views.

Referring to the drawings, 1 represents the seat portion of the motor-vehicle, 2 the storage or other battery, and 3 the electric motor by which the vehicle is propelled.

4 is the stationary member of the combined current controller and reverser, formed with a duplicate series of insulated contact-sections in parallel and separated relation.

5 is the movable member of the combined current controller and reverser, of any well-known type, preferably a pivoted arm or hand-lever carrying an insulated contact 6, having electrical connection with one pole of the battery 2, as shown, and adapted to successively establish electrical connection with the series of insulated contacts of the stationary member 4.

7 is a rheostat or variable resistance the coils of which are connected in series with the aforesaid insulated sections or contacts of the stationary member 4 and adapted by the shifting of the movable member 5 to introduce a variable resistance into the motive circuit, as usual to such type of electrical appliances. In cases where an arrangement of the batteries is depended upon to afford a variable electromotive force and current such batteries will be connected to the current controller and reverser in any usual and well-known manner, so as to be able to control the same in multiple and in series multiple at the will of the operator, and accordingly the term "current-controller" in the present description is intended to cover, broadly, a means for controlling in a variable manner the electromotive force of the electrical circuit of the vehicle, regardless of the particular arrangement and connections of such circuit and regardless of the fact that the circuit to the field or to the armature of the vehicle-motor is the circuit which is reversed in effecting a reversal of said motor with the present invention.

The present invention involves, broadly, the combination of a current-controller the movable member of which is capable of an additional movement past the point where it breaks the motor-circuit and a brake-actuating mechanism adapted to be actively operated by such additional movement of the movable members of the current-controller to effect an active operation of the brake mechanism after the motive circuit has been broken and at no other time.

In the construction shown in Figs. 1, 2, and 3 of the drawings the movable member 5 is shown as a hand-lever having a pivotal or swinging movement in both directions preferably by means of the main pivot-bolt 8 and the intermediate pivot-bolt 9 affording movement to the hand-lever in a direction transverse to that afforded by the main pivot-bolt 8. The purpose of such universal motion of the lever is to enable the same to effect a reversal of the motive current, as hereinafter set forth, and such universal movement of the lever may be attained by other equivalent means to that shown and described without departing from the spirit of this part of the present invention.

In the present construction the stationary member 4 comprises two sector-bars carrying the series of insulated contact-sections heretofore described arranged in parallel and separated relation, with an interposed bar 10 arranged between the same and forming, in connection with the sector-bars 4, two parallel guide-slots 11 and 12, which slots are connected together at front by a transverse passage 13, as shown, so as to permit the handle-lever to be shifted transversely from one to the other in effecting a reversal of the motive circuit of the system and which circuit is cross-connected in the manner illustrated in diagram Fig. 4 to enable such reversal of the motive current. The purpose of the above-described construction is to enforce a gradual diminution of the current and breaking of the circuit before a reversal can be effected, and thus prevent any liability of injury to the motor-windings due to any sudden increase of current in the same.

Another part of the present invention involves the connection of the brake-actuating mechanism of the vehicle to the movable member 5 of the current-controller and the operation of such brake-actuating mechanism by an additional movement of the same after it has broken the motive circuit of the system.

In the construction shown in Fig. 1 of the drawings, as illustrative of this part of the present invention, 14 is a bell-crank lever, one arm of which is pivoted to the link connection 15 of the brake mechanism, while the other arm is arranged to project into the path of the movable member or hand-lever 5, to be actuated by the same, the construction being such that with the additional movement of said hand-lever, as heretofore described, the brake mechanism will receive an active operation, and accordingly it is an important feature of the present invention that the said hand-lever 5 can be manipulated when so desired to effect a reversal of the motive current without actuating the brake mechanism and that operating electric current must necessarily be cut off from the motor before a braking of the vehicle-wheels, &c., can be attained.

In the present construction the transverse passage 13 will be made of such added length as to permit of the additional movement of the lever 5 in causing an active operation of the brake mechanism.

16 is a spring tending to return the brake mechanism to a dormant position.

17 is a stop limiting the movement of the bell-crank lever under the influence of the spring.

18 is an insulated contact piece or finger carried by the operating-lever or handle 5 of the current-controller and connected with one pole of the battery.

19 represents fixed segmental contact-plates connected through the field of the motor with the other pole of the battery. Said contact-plates 19 and the contact-piece 18 are adapted to maintain the current upon the field of the motor at all times except when the current-controller has interrupted the circuit of the armature of the motor, when the circuit to the field will also be broken.

20 is an insulated contact piece or finger carried by the operating-lever or handle 5 of the current-controller and connected to the pole of the battery 1 opposite to that which the contact-finger of the variable resistance heretofore described is connected.

21 represents segmental contact-plates adapted to have contact with the contact-finger 20 and cross-connected, as illustrated in diagram view, Fig. 4, to the pair of sectional contact-bars 4 of the variable resistance in order to permit of the reversal of the motor-current, as heretofore described.

Having thus fully described my said invention, what I claim as new, and desire to secure by Letters Patent, is—

1. In a system of electrical propulsion for motor-vehicles, the combination of a circuit-controller, comprising duplicate stationary members in parallel and separated relation, a movable member common to both, and means for insuring the return of the movable member to its starting position before a reversal of the current can be effected, substantially as set forth.

2. In a system of electrical propulsion for motor-vehicles, the combination of a circuit-controller, comprising duplicate stationary members in parallel and separated relation, a movable member common to both, and means for insuring the return of the movable member to its starting position before a reversal of the current can be effected the same comprising a separator-bar interposed between the stationary controller member, substantially as set forth.

3. In a system of electrical propulsion for motor-vehicles, the combination of a circuit-controller, comprising duplicate stationary members in parallel and separated relation, a movable member common to both and formed by a pivoted lever capable of longitudinal and lateral movements, and means for insuring the return of the movable member to its starting position before a reversal of the current can be effected, the same comprising a separator-bar interposed between the stationary controller members, substantially as set forth.

4. In a system of electrical propulsion for motor-vehicles, the combination of a circuit-controller, comprising duplicate stationary members in parallel and separated relation, a movable member common to both, and a brake-actuating mechanism having operative connection with the movable controller member, and adapted to be operated by a continued movement of such movable member past the point where it effects an interruption of the motor-circuit, substantially as set forth.

5. In a system of electrical propulsion for motor-vehicles, the combination of a circuit-controller, comprising duplicate stationary members in parallel and separated relation, a movable member common to both and formed by a pivoted lever capable of longitudinal and lateral movements and a brake-actuating mechanism having operative connection with the movable controlling member and adapted to be operated by a continued movement of such movable member past the point where it effects an interruption of the motive circuit, substantially as set forth.

6. In a system of electrical propulsion for motor-vehicles, the combination of a circuit-controller, comprising duplicate stationary members in parallel and separated relation, a movable member common to both and means for insuring the return of the movable member to its starting-point before a reversal of the current can be effected, and a brake-actuating mechanism having operative connection with the movable controller member and adapted to be operated by a continued movement of such movable member past the point where it effects an interruption of the motor-circuit, substantially as set forth.

7. In a system of electrical propulsion for motor-vehicles, the combination of a circuit-controller, comprising duplicate stationary members in parallel and separated relation, a movable member common to both and means for insuring the return of the movable member to its starting position before a reversal of the current can be effected, the same comprising a separator-bar interposed between the stationary controller members, and a brake-actuating mechanism having operative connection with the movable controller member, and adapted to be operated by a continued movement of such movable member past the point where it effects an interruption of the motor-circuit, substantially as set forth.

8. In a system of electrical propulsion for motor-vehicles, the combination of a circuit-controller, comprising duplicate stationary members in parallel and separated relation, a movable member common to both and formed by a pivoted lever capable of longitudinal and lateral movements, means for insuring the return of the movable member to its starting position before a reversal of the current can be effected, the same comprising a separator-bar interposed between the stationary controller members, and a brake-actuating mechanism having operative connection with the movable controller member and adapted to be operated by a continued movement of such movable member past the point where it effects an interruption of the motor-circuit, substantially as set forth.

In testimony whereof witness my hand this 8th day of August, 1899.

CLYDE J. COLEMAN.

In presence of—
 ROBERT BURNS,
 JAMES LAVALLIN.